(12) United States Patent
He et al.

(10) Patent No.: US 11,144,778 B2
(45) Date of Patent: Oct. 12, 2021

(54) DESCRIPTOR GUIDED FAST MARCHING METHOD FOR ANALYZING IMAGES AND SYSTEMS USING THE SAME

(71) Applicant: Micron Technology, Inc., Boise, ID (US)

(72) Inventors: Yuan He, Boise, ID (US); Hong Chen, Lake Oswego, OR (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/519,508

(22) Filed: Jul. 23, 2019

(65) Prior Publication Data

US 2019/0347505 A1 Nov. 14, 2019

Related U.S. Application Data

(63) Continuation of application No. 15/609,797, filed on May 31, 2017, now Pat. No. 10,614,338, which is a continuation of application No. 13/597,890, filed on Aug. 29, 2012, now abandoned.

(51) Int. Cl.
  *G06K 9/46* (2006.01)
  *G06K 9/62* (2006.01)
  *G06T 7/00* (2017.01)

(52) U.S. Cl.
  CPC ......... *G06K 9/4604* (2013.01); *G06K 9/6204* (2013.01); *G06T 7/0006* (2013.01); *G06T 2207/10061* (2013.01); *G06T 2207/30148* (2013.01)

(58) Field of Classification Search
  CPC .. G06K 9/4604; G06K 9/6204; G06T 7/0006; G06T 2207/10061; G06T 2207/30148
  See application file for complete search history.

(56) References Cited

U.S. PATENT DOCUMENTS

| | | | | |
|---|---|---|---|---|
| 5,095,204 A | * | 3/1992 | Novini | G01N 21/9045 250/223 B |
| RE33,956 E | * | 6/1992 | Lin | G01N 21/95623 250/550 |
| 5,544,256 A | * | 8/1996 | Brecher | G06T 7/0006 382/149 |
| 5,568,563 A | | 10/1996 | Tanaka et al. | |

(Continued)

OTHER PUBLICATIONS

Liapis et al. ("Colour and Texture Segmentation Using Wavelet Frame Analysis, Deterministic Relaxation, and Fast Marching Algorithms," Journal of Visual Communication Image Representation, 15 (2004)) (Year: 2004).*

(Continued)

*Primary Examiner* — Yubin Hung
(74) *Attorney, Agent, or Firm* — Perkins Coie LLP

(57) ABSTRACT

Methods and systems for descriptor guided fast marching method based image analysis and associated systems are disclosed. A representative image processing method includes processing an image of a microelectronic device using a fast marching algorithm to obtain arrival time information for the image. The arrival time information is analyzed using a targeted feature descriptor to identify targeted features. The detection of defects is facilitated by segmenting the image. The segmented image can be analyzed to identify targeted features which are then labeled for inspection.

16 Claims, 19 Drawing Sheets

(56) References Cited

U.S. PATENT DOCUMENTS

| | | | |
|---|---|---|---|
| 5,608,816 A | | 3/1997 | Kawahara et al. |
| 6,188,785 B1 | | 2/2001 | Nakamura et al. |
| 6,200,823 B1 | * | 3/2001 | Steffan .................. G09G 3/006 |
| | | | 257/E21.53 |
| 6,452,677 B1 | | 9/2002 | Do et al. |
| 6,456,899 B1 | | 9/2002 | Gleason et al. |
| 6,494,999 B1 | * | 12/2002 | Herrera ............... C23C 14/3407 |
| | | | 204/192.12 |
| 7,010,447 B2 | | 3/2006 | Ninomiya et al. |
| 7,034,272 B1 | | 4/2006 | Leonard et al. |
| 7,069,155 B1 | | 6/2006 | Phan et al. |
| 7,130,036 B1 | * | 10/2006 | Kuhlmann ............. G01N 21/47 |
| | | | 356/237.2 |
| 7,133,550 B2 | | 11/2006 | Hiroi et al. |
| 7,424,146 B2 | | 9/2008 | Honda et al. |
| 7,523,027 B2 | | 4/2009 | Chang et al. |
| 7,539,338 B2 | | 5/2009 | Fukae et al. |
| 7,570,797 B1 | * | 8/2009 | Wang ................. G01N 21/9501 |
| | | | 250/559.45 |
| 7,570,800 B2 | | 8/2009 | Lin et al. |
| 7,602,962 B2 | | 10/2009 | Miyamoto et al. |
| 7,734,082 B2 | | 6/2010 | Honda et al. |
| 7,747,062 B2 | | 6/2010 | Chen et al. |
| 8,160,351 B2 | | 4/2012 | Sandstroem et al. |
| 8,270,703 B2 | * | 9/2012 | Takahashi ............. G06T 7/0004 |
| | | | 382/149 |
| 8,452,076 B2 | | 5/2013 | Nakagaki et al. |
| 9,070,180 B2 | | 6/2015 | Amzaleg et al. |
| 9,330,450 B2 | | 5/2016 | Sah et al. |
| 2003/0053046 A1 | * | 3/2003 | Ise .................... G01N 21/9501 |
| | | | 356/237.2 |
| 2003/0076989 A1 | | 4/2003 | Maayah et al. |
| 2003/0169916 A1 | * | 9/2003 | Hayashi ............. G01N 21/9503 |
| | | | 382/145 |
| 2003/0223639 A1 | * | 12/2003 | Shlain .................. G06K 9/4647 |
| | | | 382/190 |
| 2004/0218806 A1 | | 11/2004 | Miyamoto et al. |
| 2005/0010890 A1 | * | 1/2005 | Nehmadi ................. G03F 1/36 |
| | | | 700/121 |
| 2005/0139772 A1 | * | 6/2005 | Hasegawa ............... H01J 37/29 |
| | | | 250/311 |
| 2005/0146714 A1 | * | 7/2005 | Kitamura ................. G06K 9/00 |
| | | | 356/237.2 |
| 2005/0177315 A1 | * | 8/2005 | Ghosh .................... G16B 25/00 |
| | | | 702/20 |
| 2005/0194535 A1 | | 9/2005 | Noji et al. |
| 2005/0224457 A1 | * | 10/2005 | Satake .................... H01L 22/22 |
| | | | 216/59 |
| 2007/0116380 A1 | * | 5/2007 | Ciuc ....................... G06T 5/005 |
| | | | 382/275 |
| 2009/0013304 A1 | | 1/2009 | Peng |
| 2009/0196490 A1 | | 8/2009 | Matsumiya |
| 2010/0128988 A1 | * | 5/2010 | Kincaid ............... G06K 9/6253 |
| | | | 382/199 |
| 2011/0317903 A1 | * | 12/2011 | Hasslmeyer .............. G06T 7/11 |
| | | | 382/133 |
| 2011/0320023 A1 | * | 12/2011 | Sullivan ........... G05B 19/41875 |
| | | | 700/98 |
| 2012/0027286 A1 | * | 2/2012 | Xu ......................... G01N 21/95 |
| | | | 382/149 |
| 2012/0197713 A1 | * | 8/2012 | Stroila ............... G01C 21/3638 |
| | | | 705/14.49 |
| 2012/0327403 A1 | * | 12/2012 | Obuchi .............. G01N 21/8851 |
| | | | 356/237.2 |
| 2013/0035867 A1 | * | 2/2013 | De Moor ................. G06K 9/38 |
| | | | 702/19 |
| 2013/0230230 A1 | * | 9/2013 | Ajemba ............. G06K 9/00147 |
| | | | 382/133 |
| 2013/0304399 A1 | * | 11/2013 | Chen ........................ G06T 7/12 |
| | | | 702/40 |
| 2017/0357870 A1 | | 12/2017 | He et al. |

OTHER PUBLICATIONS

Yan et al. ("Applying improved fast marching method to endocardial boundary detection in echocardiographic images," Pattern Recognition Letters, vol. 24, No. 15, Nov. 2003) (Year: 2003).*

Sebbe et al. ("Segmentation of Opacified Thorax Vessels using Model-driven Active Contour," IEEE 27th Annual Conference Engineering in Medicine and Biology, 2005) (Year: 2005).*

J.A. Sethian. Advancing Interfaces: Level Set and Fast Marching Methods, Dept. of Mathematics, Univ. of California, Berkeley, 1999, 12 pages.

Yan, Jiayong, et al. "Lymph node segmentation from CT images using fast marching method." Computerized Medical Imaging and Graphics 28.1 (2004): 33-38. 6 pages.

Yapa, Roshan Dharshana, and Koichi Harada. "Breast skin-line estimation and breast segmentation in mammograms using fastmarching method." International Journal of Biological, Biomedical and Medical Sciences 3.1 (2008): 54-62. 9 pages.

"Malladi, R. et al., Level Set and Fast Marching Methods in Image Processing and Computer Vision, Proceedings, International Conference on Image Processing, Sep. 1996, pp. 489-492."

"Porikli, F., Automatic Image Segmentation by Wave Propagation, Mitsubishi Electric Research Laboratory, Mar. 2004, 10 pages."

* cited by examiner

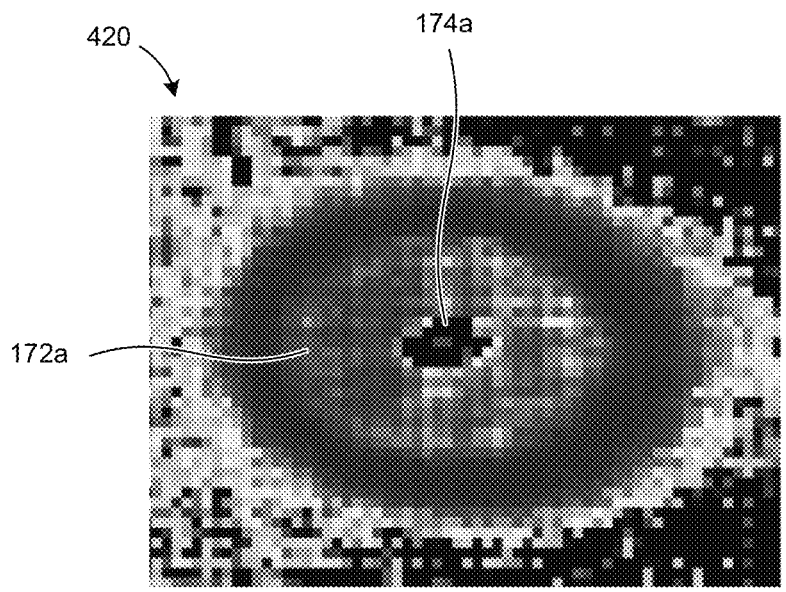
FIG. 23
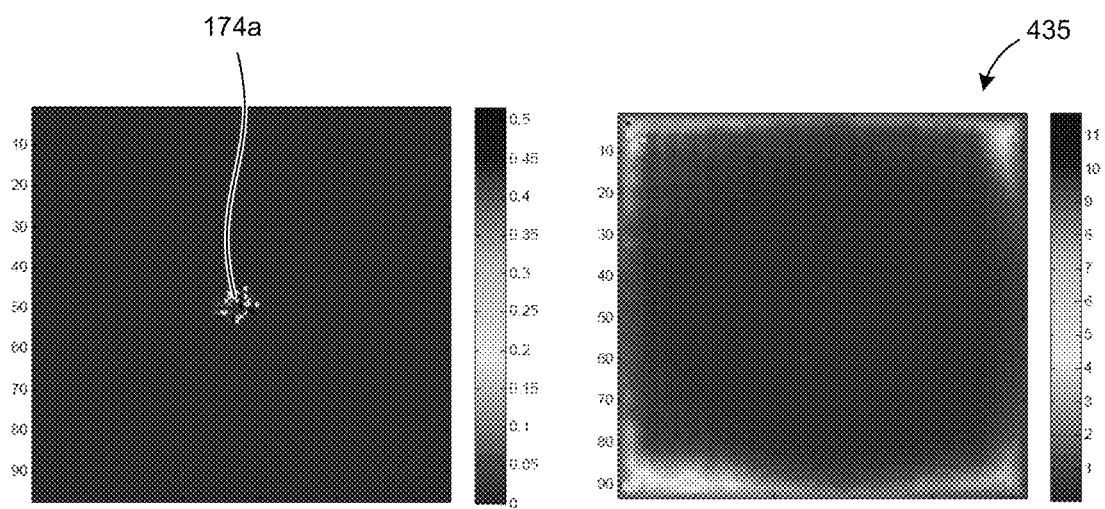
FIG. 24  FIG. 25

DESCRIPTOR GUIDED FAST MARCHING METHOD FOR ANALYZING IMAGES AND SYSTEMS USING THE SAME

CROSS-REFERENCE TO RELATED APPLICATION

This application is a continuation of U.S. patent application Ser. No. 15/609,797, filed May 31, 2017, now U.S. Pat. No. 10,614,338; which is a continuation of U.S. patent application Ser No. 13/597,890, filed Aug. 29, 2012; each of which is incorporated herein by reference in its entirety.

TECHNICAL FIELD

The present technology is directed generally to descriptor guided fast marching method for analyzing images and associated systems.

BACKGROUND

Manufacturers of microelectronic devices are continually reducing the size and increasing the density of components in integrated circuits to increase the speed and capacity of devices and reduce the power consumption. Complex series of manufacturing protocols, inspection protocols, and testing protocols are often performed to produce microelectronic devices, such as light-emitting diodes (LEDs), integrated circuits, and microelectromechanical systems (MEMS). It may be difficult to rapidly and accurately detect defects in microelectronic devices. For example, microelectronic devices often include circuitry with vias that are formed by depositing conductive material into openings (e.g., through-holes) in wafers. The conductive material may deposit faster at the edges of the openings than within the holes, and the build-up of conductive material at the openings may inhibit deposition of conductive material at central regions of the holes resulting in voids or other defects. These voids are commonly referred to as keyholes. A scanning electron microscope (SEM) image can be visually inspected to locate and identify keyholes. However, it is difficult to locate and accurately identify keyholes because SEM images often have significant noise and low contrast, and keyholes often vary in size and shape.

Conventional automated systems can compare patterns to identify defects. For example, a conventional automated system can compare a pattern in a captured image to a reference pattern and identify defects based on the comparison. Conventional automated systems can also measure critical dimensions that are necessary to the function of the component. Unfortunately, reference patterns or critical dimensions have to be known before performing pattern comparison or critical dimension measurements. Additionally, detection rates of potential defects using pattern comparison or critical dimension measurements can decrease significantly when analyzing images with irregular shaped features (e.g., keyholes), significant noise, and low-contrast.

BRIEF DESCRIPTION OF THE DRAWINGS

FIG. 23 illustrates an arrival time image of a via with a defect in accordance with an embodiment of the present technology.

FIG. 24 illustrates a segmented image of the via of FIG. 23 in accordance with an embodiment of the present technology.

FIG. 25 illustrates a segmented arrival time image of a via in accordance with an embodiment of the present technology.

DETAILED DESCRIPTION

Specific details of several descriptor guided image processing methods and systems using the same are described below. In particular embodiments, the image processing methods are performed on images of a microelectronic device. The images can be from an electron microscope (e.g., a scanning electron microscope (SEM), a transmission electron microscope (TEM), or the like), an optical imager (e.g., an optical microscope, a camera, etc.), or other type of imaging equipment capable of capturing images for defect recognition, pattern recognition, or the like. The term "image" generally refers to raw images, preprocessed images, processed images, labeled images, and the like. The term "SEM image" generally refers to an image produced by a SEM and may be in grayscale or color. A person skilled in the relevant art will understand that the technology may have additional embodiments, and that the technology may be practiced without several of the details of the embodiments described below with reference to FIGS. 1-29.

Figure 1:
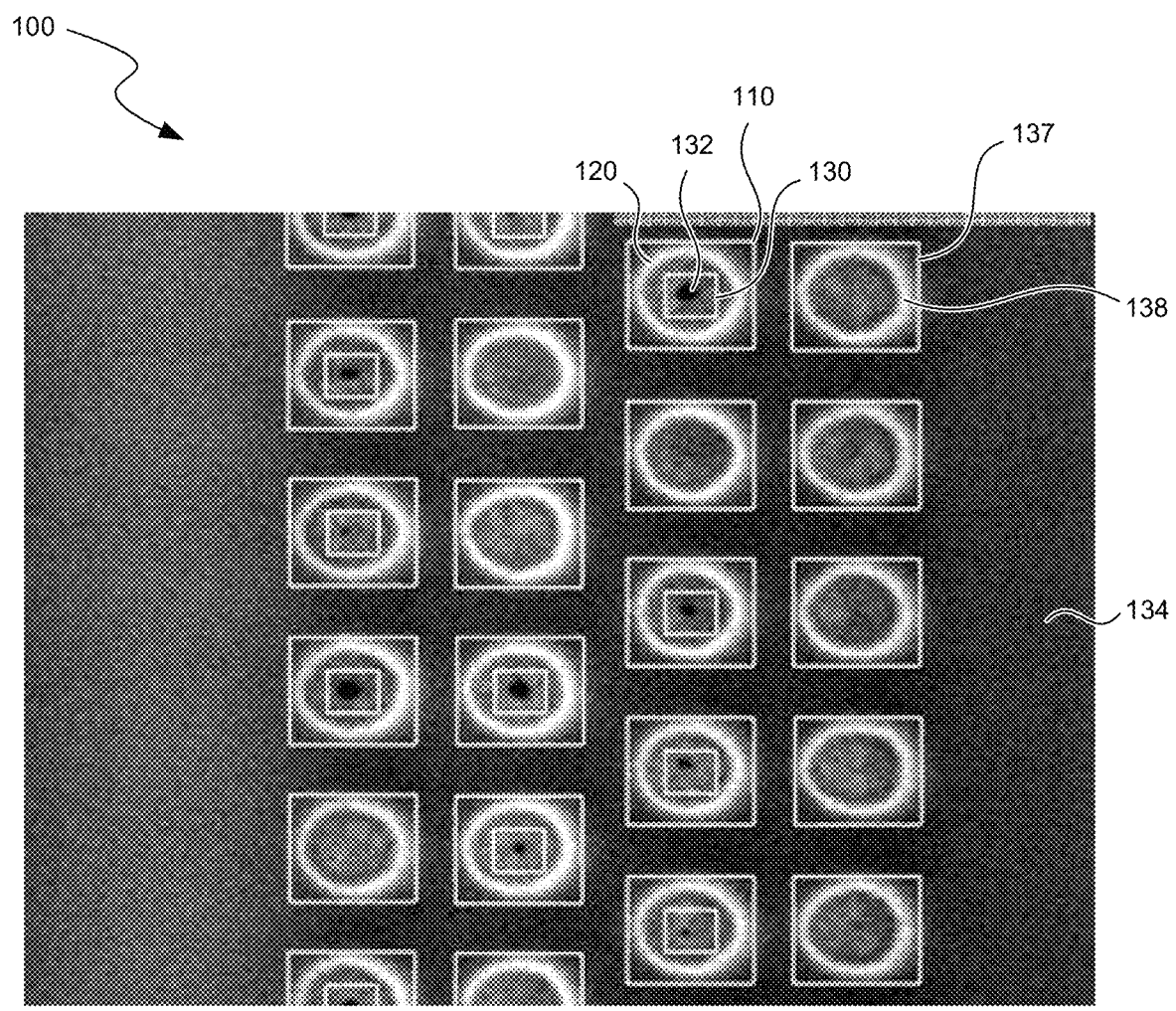
FIG. 1 illustrates an image of a microelectronic device with features identified in accordance with an embodiment of the present technology.

FIG. 1 illustrates a SEM image 100 with targeted features of a microelectronic device identified using descriptor guided image processing. The SEM image 100 can include boxes 110 that identify vias 120 and boxes 130 that identify potential defects 132. The potential defects 132 can be visually inspected to determine, for example, whether the potential defects 132 are actual defects. The labeling can increase identifying accuracy and increase inspection throughput.

The vias 120 can be formed using a multi-step process, including forming an insulated opening (e.g., an insulated through-hole) in a substrate 134. After forming the opening, a filling process (e.g., physical vapor deposition, chemical vapor deposition, sputtering, etc.) may be performed to fill the opening with a conductive material. If the conductive material accumulates at the periphery of the opening in the substrate 134 faster than within the hole, a keyhole may be formed. The potential defect 132 in FIG. 1 is such a keyhole. The boxes 110, 130 help a viewer conveniently locate and analyze the via 120 and potential defect 132. A box 137 identifies a properly formed via 138 (e.g., a via without a keyhole).

Figure 2:
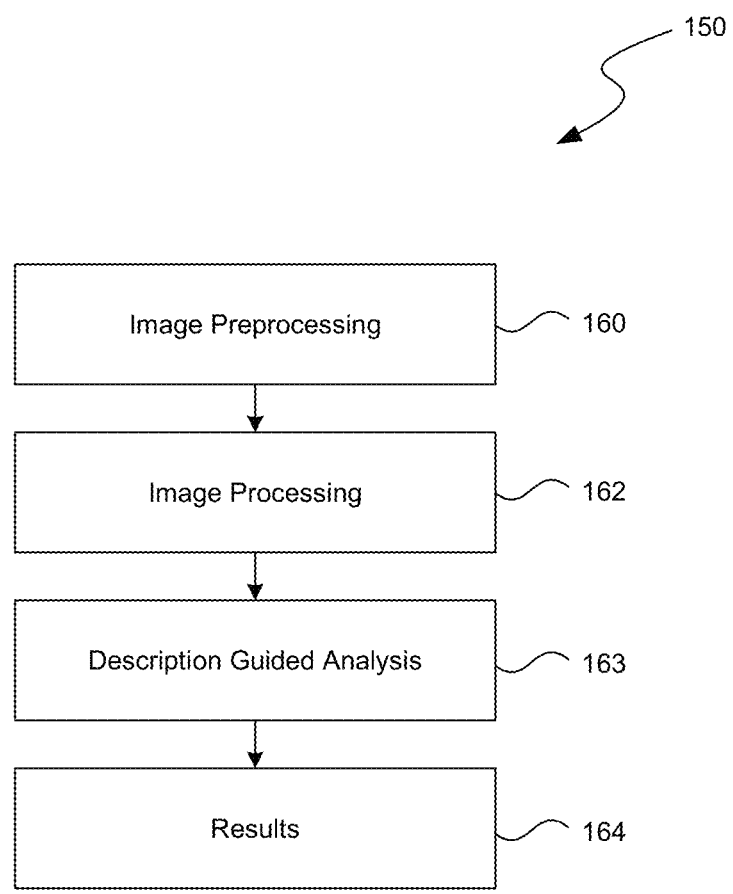
FIG. 2 is a flowchart for processing an image in accordance with an embodiment of the present technology.

FIG. 2 is a flowchart for processing an image. Generally, a descriptor guided fast marching method 150 can include preprocessing an image (block 160), processing and image (block 162), performing a descriptor guided analysis (block 163), and outputting results (block 164). The descriptor guided fast marching method 150 can be performed to analyze different types of images, including SEM images, TEM images, optical images (e.g., images from an optical microscope), or the like. The magnification of the image may vary depending on the type of microelectronic device (e.g., a substrate, a wafer, a diced wafer, integrated circuitry, semiconductor device, semiconductor die, LED, etc.) and the features (e.g., contacts, vias, runners, traces, electrodes, wires, solder balls, etc.) to be analyzed. Microelectronic devices include, without limitation, light emitters (e.g., laser diodes, LEDs, etc.), processed wafers (e.g., wafers with circuitry), memory, MEMS structures, or the like.

At block 160, an image is preprocessed to produce a preprocessed image. Image preprocessing can include correction processing such as, without limitation, intensity correction, color correction, saturation correction (e.g., color saturation correction), contrast correction, and/or tilt correction. A wide range of different types of filters, algorithms, and routines (e.g., data fitting routines) can be used for correction processing to increase the accuracy of descriptor based analysis, decrease image processing times, or achieve other results. Other types of imaging preprocessing can also be performed.

At block 162, the preprocessed image can be further processed using a fast marching method to smooth data and generate arrival time information that can include, without limitation, an arrival time function, an arrival time image, an arrival time matrix, or the like. The arrival time function can be a smooth, continuous function (e.g., a differentiable function, a monotonic function, etc.) suitable for contour analysis (e.g., intensity contour analysis, color contour analysis, etc.), segmentation (e.g., segmentation based on one or more descriptors), or the like. The arrival time image can be inspected to identify targeted features, such as potential defects, structural features, electrical features, etc. The arrival time image can be visually inspected by, for example, a technician, a wafer inspector, or an engineer. Additionally or alternatively, an automated system can inspect the arrival time image. The arrival time matrix can be analyzed using statistical techniques, numerical techniques, or the like. In some embodiments, the fast marching method uses different fast marching algorithms to process different targeted features. The targeted features can include, without limitation, patterns, potential defects (e.g., stiction, keyholes, cracks, improperly formed bond pads, etc.), edges (e.g., edges of cleaved or singulated LEDS), boundaries, or the like.

The fast marching method can process images without having information about the image. For example, the fast marching method can start at high intensity areas (e.g., light areas) of an image that may correspond to areas surrounding a potential defect and move towards low intensity area(s) (e.g., dark areas) that may correspond to the potential defect. As the fast marching method moves towards low intensity area(s), the fast marching method can detect a boundary of the potential defect. In other embodiments, the starting areas can be in low intensity areas of an image and move towards high intensity area(s) to detect a boundary of the potential defect. In some embodiments, starting areas are in a portion of an image having a uniform intensity such that the fast marching method identifies intensity variations as boundaries of potential defects (e.g., regular shaped defects, irregularly shaped defects, etc.).

In some embodiments, the fast marching method can identify and/or analyze the interior regions of contacts or vias. For example, to identify interior areas of vias, a raw image can be processed to produce an arrival time image representative of the vias. The fast marching method can process such raw images to identify the interior areas of vias without having information about the image.

At block 163, a descriptor guided analysis can be used to identify targeted features based on a targeted feature descriptor. The targeted feature descriptor can include a segmentation algorithm that performs segmentation using on one or more criteria (e.g., a threshold value, mean, mode, median, rate of change, standard deviation, etc.) based on, for example, intensity, color coordinators, or the like. Additionally or alternatively, the targeted feature descriptor can include a defect descriptor algorithm used to identify potential defects whereas a pattern descriptor can be used to identify patterns (e.g., a regular pattern, an irregular pattern, etc.). Defects can include, without limitation, holes (e.g., voids, keyholes, etc.), stictions, improperly positioned features, misaligned features, substrate defects (e.g., defects in unprocessed wafers, processed wafers, etc.), or the like.

The fast marching method can take image intensity of an image as a speed function and convert it into arrival time information to, for example, reduce, limit, or substantially eliminate noise, identify/analyze selected features (e.g., edges of vias, edges of contacts, edges of runners, or the like), or the like. The targeted feature descriptor can be used to determine the arrival time mark of reaching a predetermined area corresponding to the area of the targeted feature. The arrival time mark can define the domain of each feature to enable identification of internal areas of the features that exhibit significant acceleration. For example, if more than a predetermined number of neighboring pixels or cells within a predetermined area show significant acceleration (e.g., acceleration at or above a threshold level), the pixels or cells can be identified as a potential defect. Additionally or alternatively, a set of edge vectors (with or without offset tolerance) can be used to analyze patterns, such as irregular patterns and regular patterns. In some embodiments, a set of edge vectors can be used to separate an irregular pattern from a regular pattern at the same general area intensity level.

At block 164, the results of the descriptor guided analysis are outputted and can include, without limitation, labeled images, statistics, correction routines, optimization routines, reports, or the like. The labeled images can be labeled raw images, labeled preprocessed images, labeled processed images, or the like. The labels can be boxes, highlighting, annotation, or other types of indicators for identifying features or areas for visual inspection, automated inspection, or the like. The statistics can include, without limitation, across-wafer statistics, batch statistics, wafer-to-wafer statistics, or the like. The correction routines can be used to adjust processing parameters (e.g., processing parameters for deposition equipment, processing parameters for CMP equipment, etc.) to reduce the frequency of defects, increase throughput, or otherwise enhance processing. The reports can include, without limitation, characteristics of identified features, statistics, alignment information, or the like.

Figure 3:
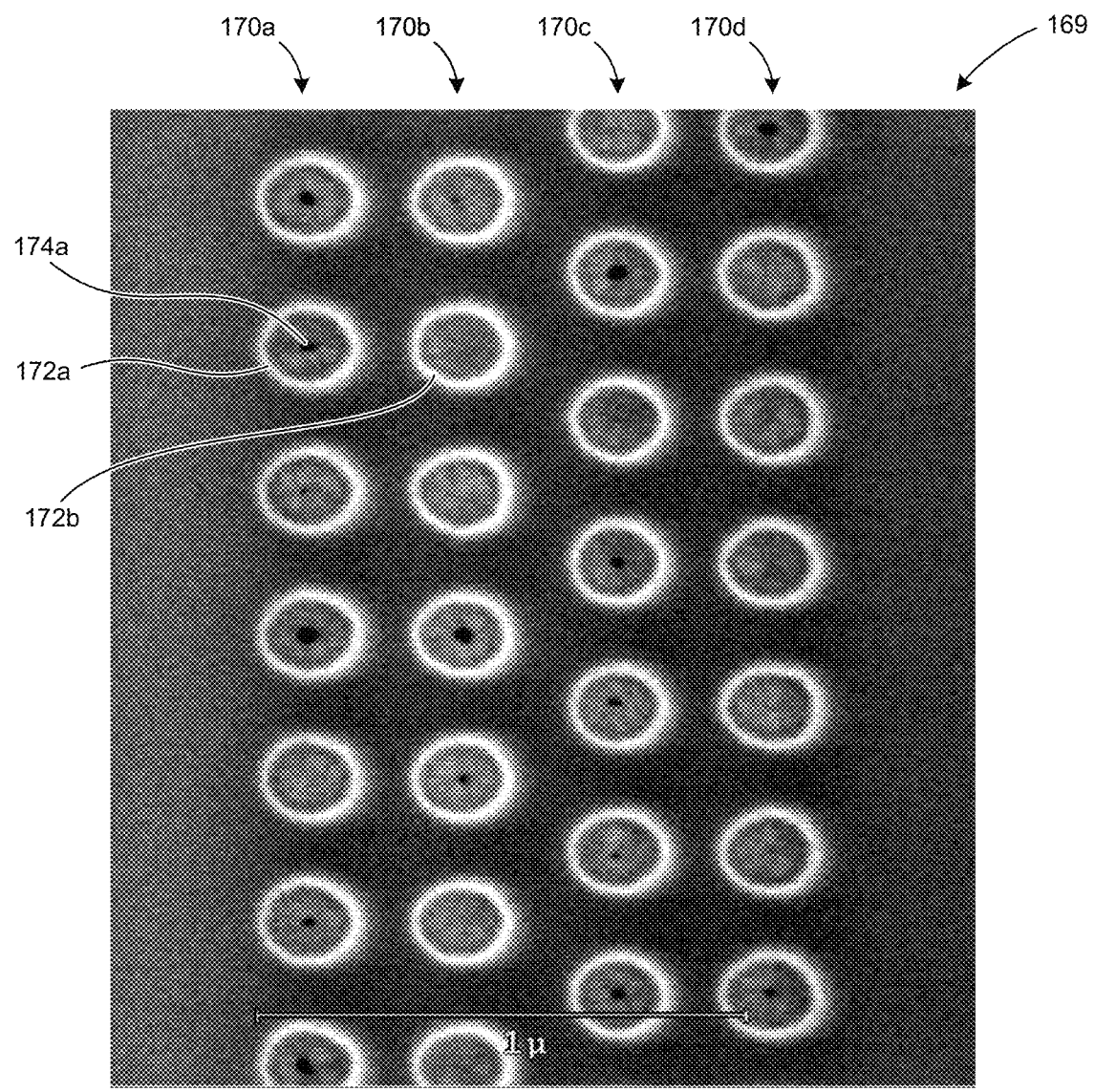
FIG. 3 illustrates an image of a portion of a microelectronic device with an array of vias.

FIG. 3 illustrates a SEM image 169 of a microelectronic device with columns 170a, 170b, 170c, 170d (collectively 170) with spaced apart vias. The diameters of the vias can be in a range of, for example, about 0.1 μm to about 0.25 μm. Because keyholes may have diameters less than about 0.01 μm and may vary in shape and size, it may be difficult to rapidly and accurately identify keyholes. For example, a viewer may have difficulty in identifying a keyhole 174a in via 172a, whereas via 172b does not have such a defect.

Figure 4:
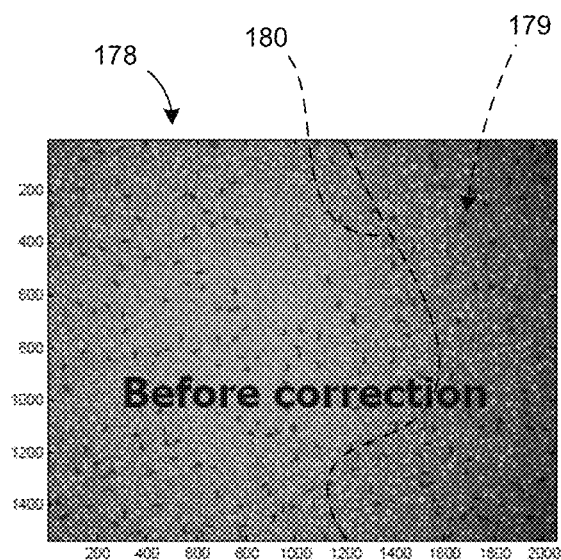
FIG. 4 illustrates an image before correction processing.
Figure 5:
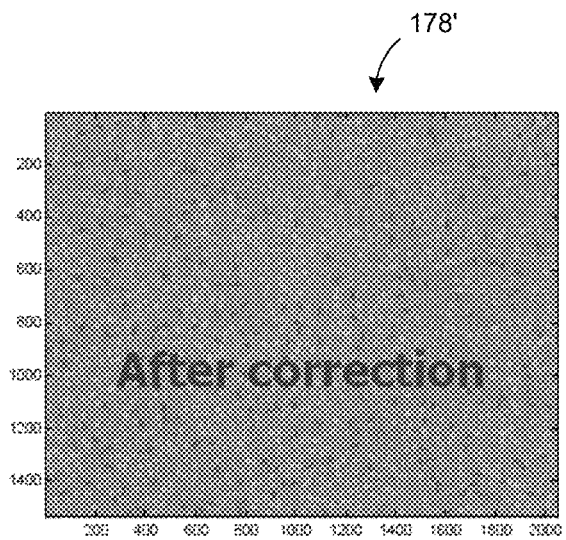
FIG. 5 illustrates a preprocessed image in accordance with an embodiment of the present technology.

FIGS. 4 and 5 show stages of an embodiment of processing a SEM image. FIG. 4 shows a SEM image 178 that includes intensity variations which can result in a relatively dark region 179 (indicated by a dashed line 180). FIG. 5 shows a preprocessed image 178' in which noise has been removed for a substantially uniform background intensity to increase the accuracy of subsequent image processing.

Figure 6:
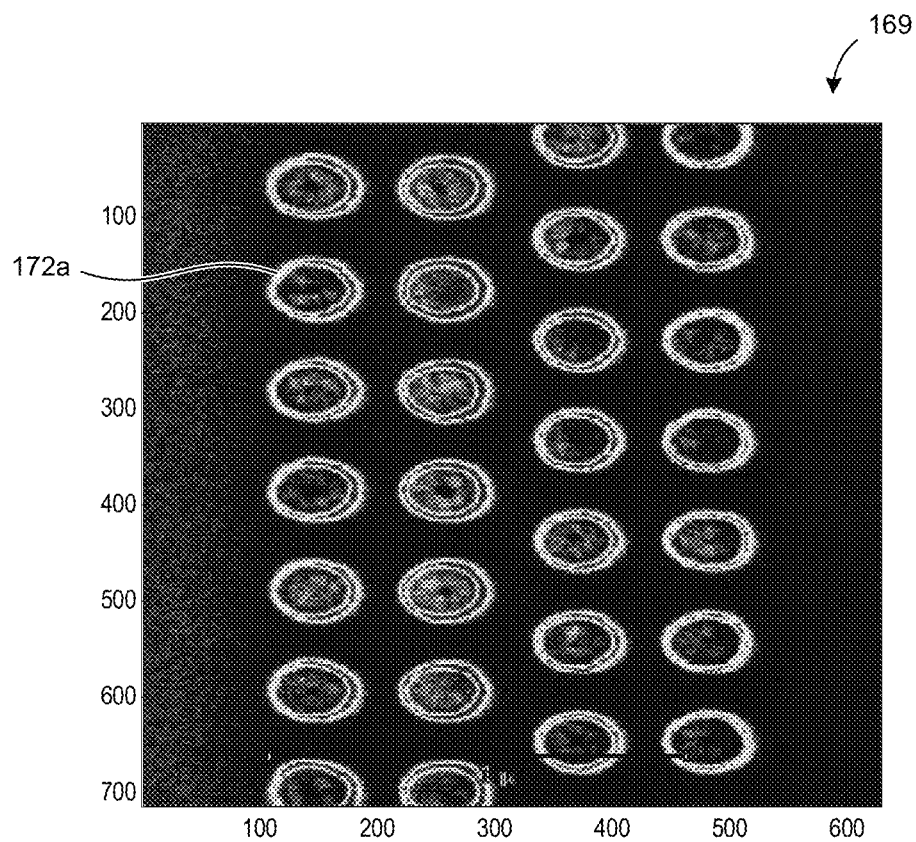
FIG. 6 illustrates a preprocessed image in accordance with an embodiment of the present technology.

FIG. 6 illustrates an example of a preprocessed image 169 in accordance with an embodiment of the present technology. The vias (e.g., via 172) in the preprocessed image 169 can have well-defined boundaries. The fast marching method can convert the preprocessed image 169 to an arrival time image.

Figure 7:
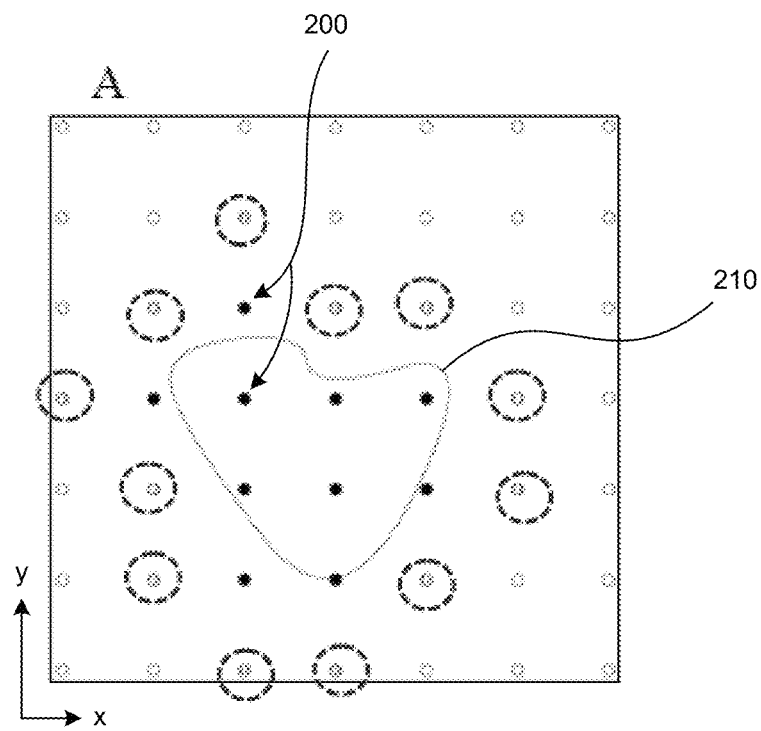
FIGS. 7-9 illustrate stages of a fast marching method in accordance with an embodiment of the present technology.
Figure 8:
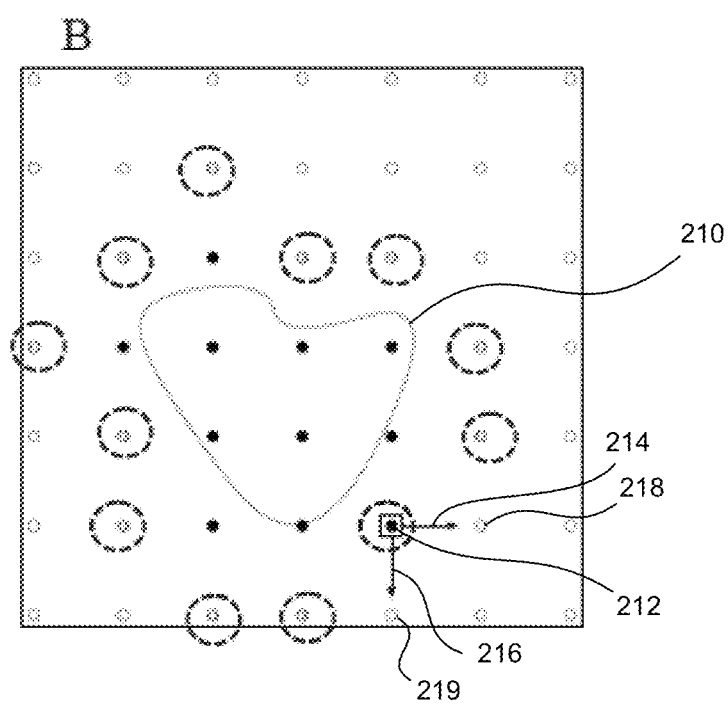
Figure 9:
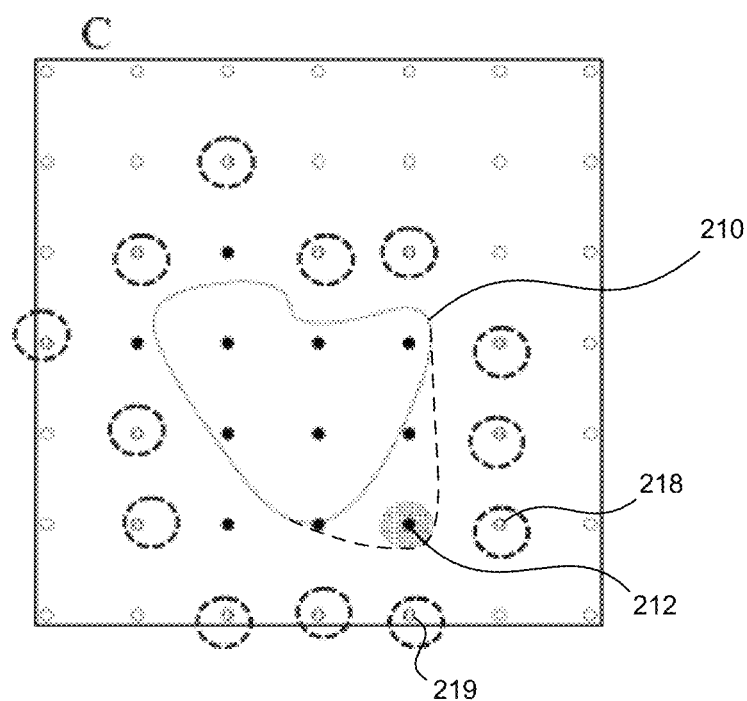

FIGS. 7-9 show examples of stages of the fast marching method. The fast marching method can generally include identifying at least one starting area and marching through one area (e.g., a cell, a pixel, etc.) at a time to determine arrival information for non-starting areas in a manner that converts intensity of different regions of an image to arrival time information. The fast marching method can process an entire image or a portion thereof.

Referring to FIG. 7, ten frozen areas are represented by solid dots 200. Each dot 200 can be one or more pixels or cells in which arrival time information has been determined. The twelve adjacent circled unfrozen dots represent candidate dots within a narrow band suitable for movement of a wave-front 210. A wave front algorithm can be used to solve a boundary value equation to determine arrival time information (e.g., arrival time, acceleration, etc.) at each candidate dot. In some embodiments, the boundary value equation can be an Eikonal equation describing the movement of the wave front 210 according to the equation:

$$R|\nabla T|=1 \qquad \text{(Equation I)}$$

where R is a rate (speed function) at (x, y) of an image and T is the arrival time at (x, y) of the image. The rate (speed function) can be the intensity of a cell or a pixel at a location (x, y) of the image.

Referring to FIG. 8, the movement of the wave front 210 to a candidate unfrozen dot or a live dot (shown as circles with open centers) can be determined based on whether that candidate unfrozen dot corresponds to the fastest arrival time. The unfrozen dot 212 of FIG. 8 has the fastest arrive time. FIG. 8 shows the dot 212 after it has been frozen. Arrows 214, 216 indicate two non-frozen neighboring dots 218, 219. FIG. 9 shows candidate dots 218, 219 (circled in dashed lines) selected for the next iteration. The circled dots in FIG. 9 are analyzed to determine which circled dot has the fastest arrival time. In this manner, the fast marching method can work outwardly away from frozen areas.

Because boundaries of the targeted features may be identified by sudden changes in intensity, starting areas can be spaced apart from sudden changes in intensity. In some images, keyholes may appear as black dots whereas the upper surfaces of vias may be light gray or some other higher intensity. The fast marching method can move away from starting areas in high intensity regions surrounding the keyhole to areas of low intensity in the keyholes. This helps ensure that boundaries of the keyholes are accurately detected. By way of example, the dots 200 of FIG. 7 can correspond to a portion of the via surrounding a keyhole. The wave front 210 can move towards and across the boundary of the keyhole. Alternatively, the dots 200 of FIG. 7 can be located in an area corresponding to a keyhole.

Figure 10:
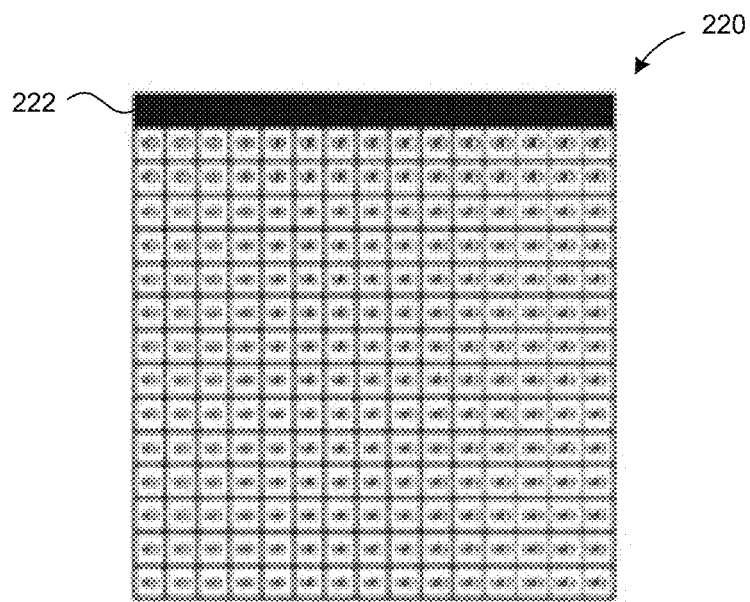
FIGS. 10-13 illustrate starting areas for fast marching methods in accordance with an embodiment of the present technology.

FIGS. 10-13 illustrate examples of different patterns of starting areas for producing an arrival time image that is representative of features in an image. The grids can be filled with data obtained using the fast marching method to produce an arrival time image corresponding to an image (e.g., an image serving as a rate function of the Eikonal equation). FIG. 10 shows a grid 220 that has fifteen rows and fifteen columns of cells each containing a dot or point. Distances between cells of the grid 220 can be determined using the dots or points. An upper row 222 has frozen arrival time starting areas (illustrated as filled areas) or frozen dots. The row adjacent the upper row 222 can be a narrow band of candidate cells for the fast marching method discussed in connection with FIGS. 7-9. Arrival times are used to fill in the unfrozen areas (illustrated as unfilled or empty areas) of the grid 220. For example, each cell of the grid 220 can be filled with an arrival time that is calculated based on the intensity in a corresponding cell in a processed image to create an arrival time image. An example fast marching method for producing an arrival time image is discussed in connection with FIGS. 14-22.

Figure 11:
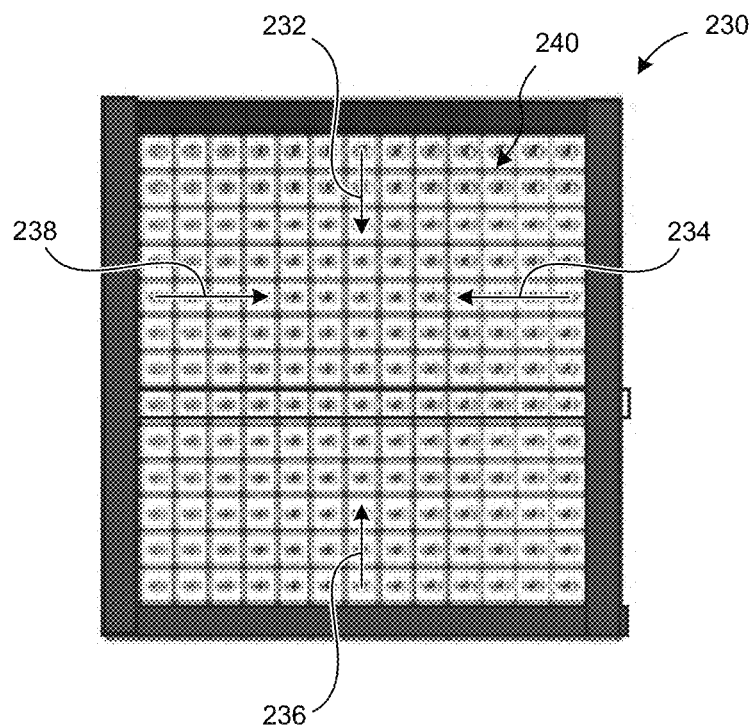
Figure 12:
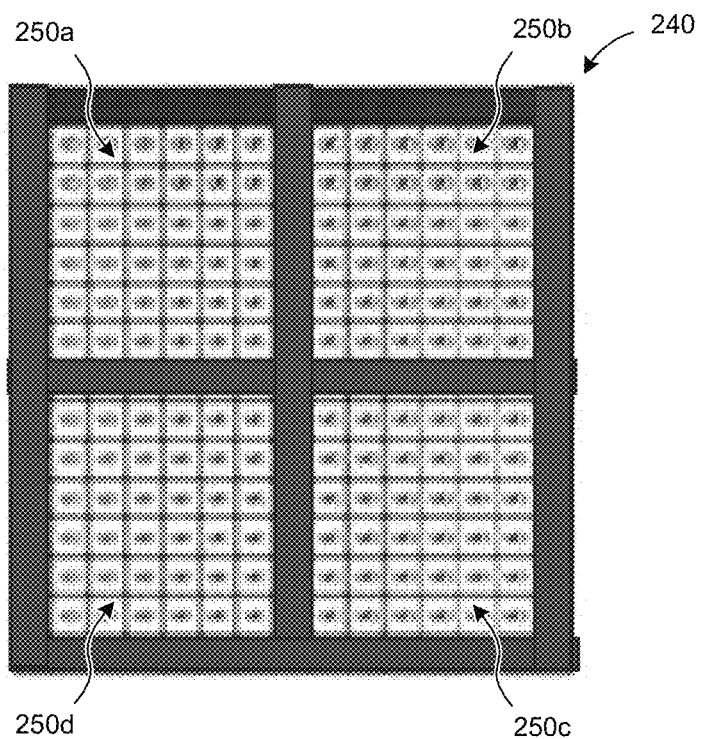
Figure 13:
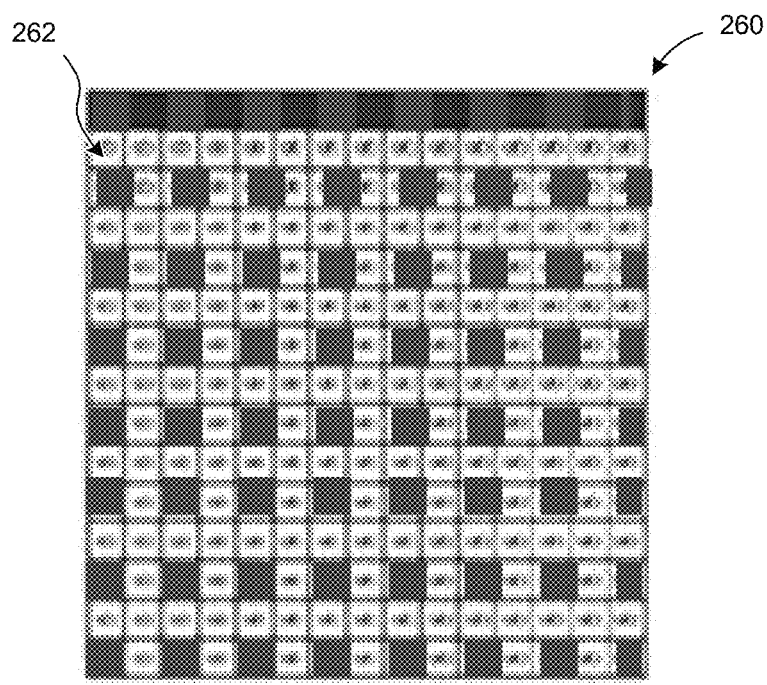

Referring to FIG. 11, starting areas 230 surround non-starting areas 240. The fast marching method can work away from the starting areas 230, as indicated by arrows 232, 234, 236, 238. Referring to FIG. 12, starting areas 240 define four groups 250a, 250b, 250c, 250d (collectively 250) of non-starting areas. Each group 250 has thirty-six non-starting areas 250. FIG. 13 shows an upper row 260 of starting areas and a spaced apart array 262 of starting areas. The number of starting areas, spacing of starting areas, dimensions of starting areas (e.g., width, length, etc.), shapes of starting areas (e.g., square, rectangular, triangular, etc.), and pattern of starting areas can be selected based on, for example, the characteristics of features to be identified and characteristics of the image to be analyzed. For example, starting areas can be selected to minimize, limit, or substantially eliminate a distance effect such that the calculated arrival time is based primarily or entirely on intensity.

Figure 14:
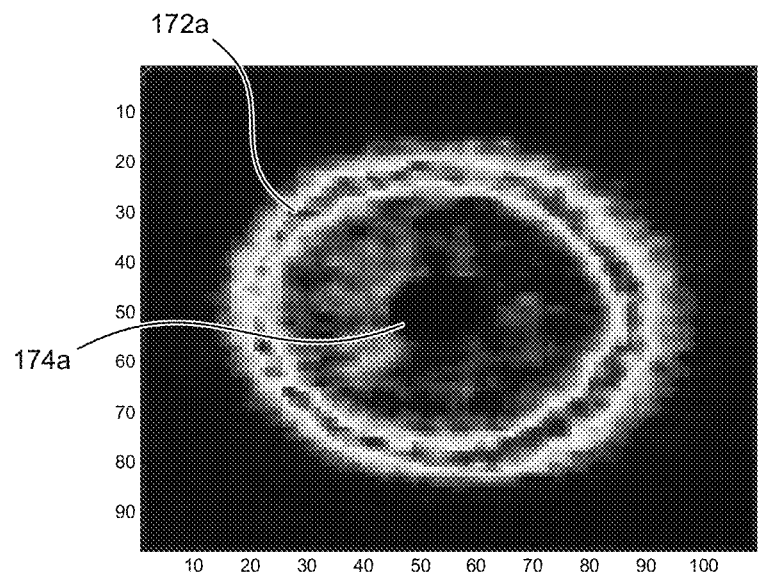
FIGS. 14-18 illustrate a process for producing an arrival time image in accordance with an embodiment of the present technology.
Figure 15:
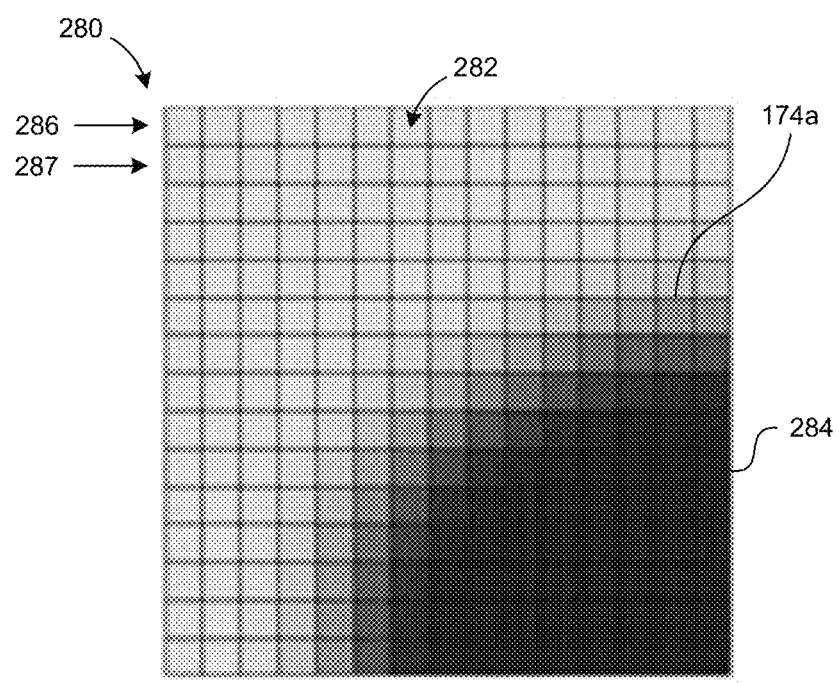
Figure 16:
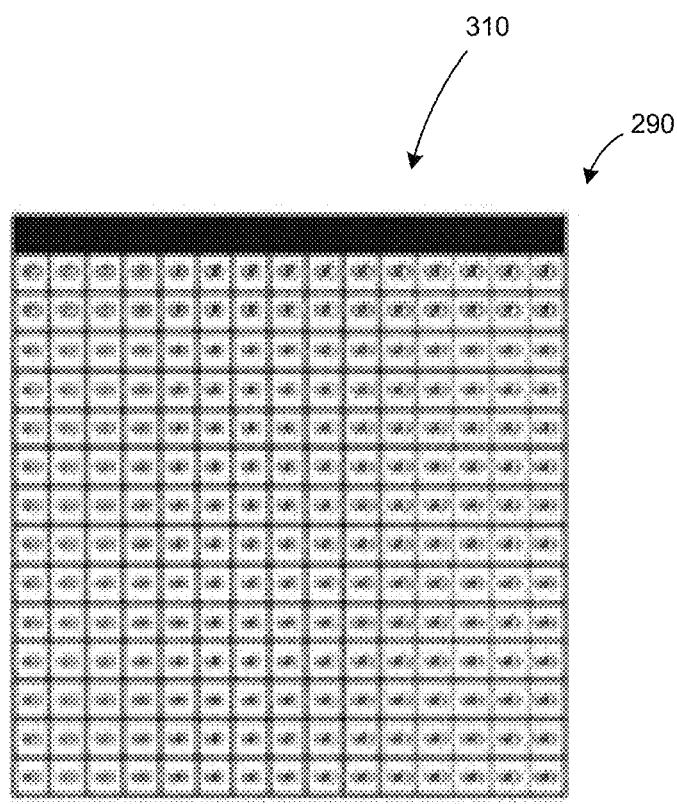
Figure 17:
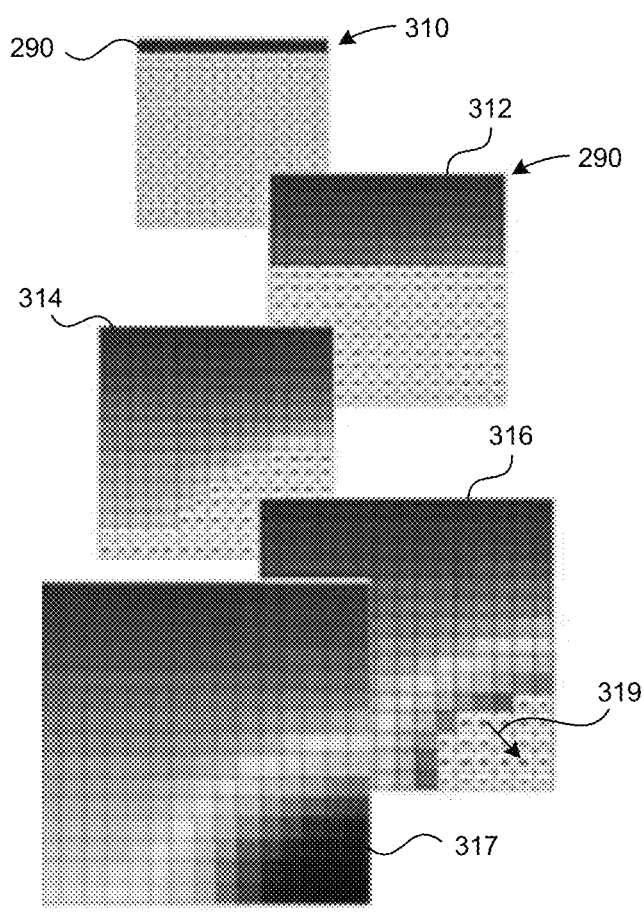
Figure 18:
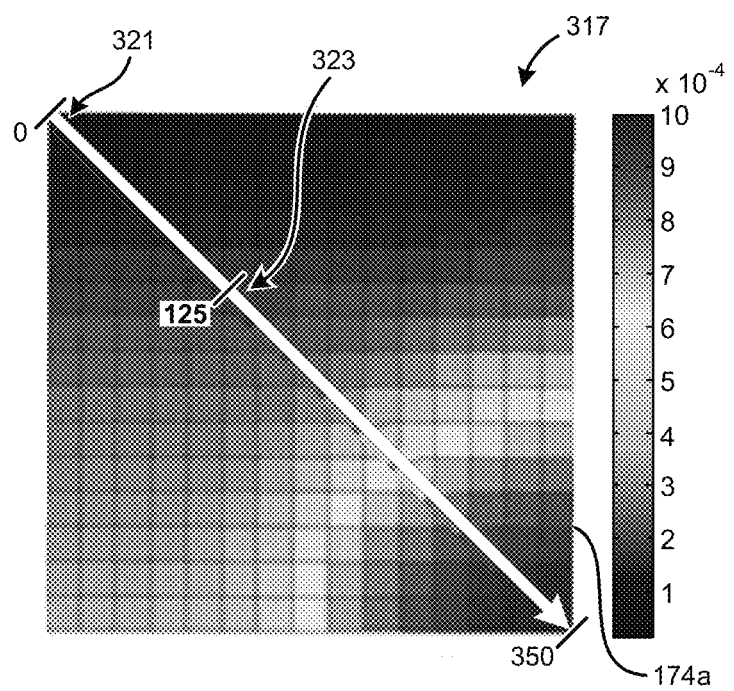

FIGS. 14-18 illustrate examples of stages of a process of evaluating a keyhole. FIG. 14 shows a preprocessed image of the via 172a and the keyhole 174a. FIG. 15 illustrates a preprocessed image 280 of a portion of the keyhole 174a and a grid superimposed on the preprocessed image. FIG. 16 shows a partially filled arrival time image. FIG. 17 shows five stages of producing an arrival time image. FIG. 18 shows an arrival time image corresponding to the preprocessed image 280 of FIG. 15.

Referring to FIG. 15, the image 280 has a high intensity region 282 and a low intensity region 284. In this example, the low intensity region 284 corresponds to a portion of the keyhole 174a, and an upper row 286 of cells can be selected as starting areas. Arrival times can be determined by setting the starting areas initial starting arrival time=0 and the other areas arrival time=∞ to solve an Eikonal equation (see, e.g., Equation I above) based on the image 280 serving as a rate or speed function. Cells in the upper row 290 of FIG. 16 are filled to represent the arrival time=0. The filled cells in the upper row 290 are referred to as "arrival time starting areas." The fast marching method can sequentially work outward from the starting areas to convert the intensity of the cells in the preprocessed image 280 of FIG. 15 to arrival times used to fill corresponding cells of the arrival time image 310 of FIG. 16. The filled cells of FIG. 16 are referred to as an "arrival time starting areas." A row 287 in FIG. 15 can be the narrow band of candidate cells for the next iteration of the fast marching method.

Referring to FIG. 17, the image 310 shows arrival times for the arrival time starting areas in the row 290. Image 312 shows cells filled with arrival times using the fast marching method that moves uniformly away from the starting areas of the row 290. Image 314 shows cells filled by the fast marching method working outwardly towards the high intensity areas of the image 280 (FIG. 15). After filling the cells corresponding to high intensity areas, the fast marching method moves towards the low intensity areas of image 280 (FIG. 15). Image 316 shows cells filled as the fast marching method moves in the direction indicated by arrow 319. Image 317 shows all of the cells filled with calculated arrival times and is referred to as an "arrival time starting areas." FIG. 18 shows the arrival time image 317 in which an arrow indicates the direction in which measurements are taken for descriptor guided analysis. The arrival time image 317 is representative of the image 280 in FIG. 15.

Figure 19:
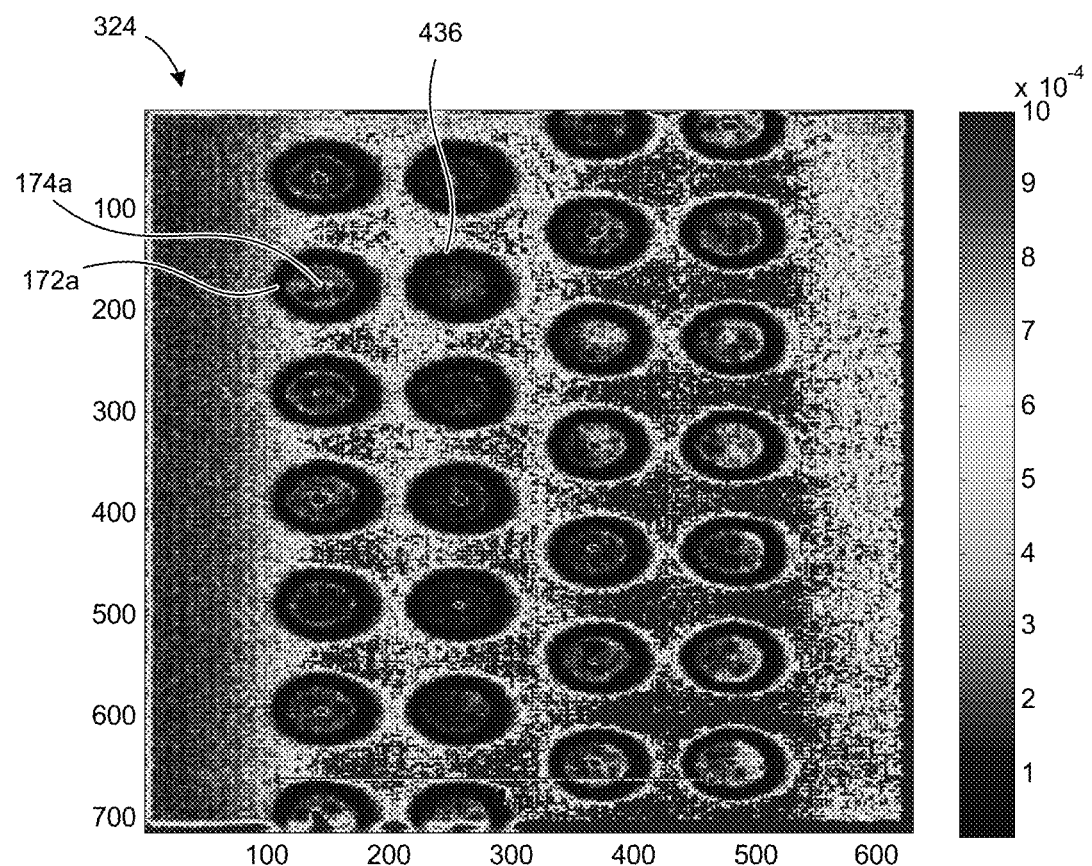
FIG. 19 illustrates a processed image of a portion of a microelectronic device in accordance with an embodiment of the present technology.

FIG. 19 illustrates an arrival time image 324 generated using the fast marching method. The arrival time image 324 can be the time function and the image 280 can be a rate function of the Eikonal equation. The entire image 324 can be produced using a single fast marching routine. In other embodiments, each via can be identified using a separate fast marching routine. Each identified via can be separately analyzed to identify defects in the respective via. The fast marching routines for identifying vias can be different from fast marching routines used to identify defects in the vias. For example, the resolution of the fast marching method for analyzing internal areas of the vias can be higher than the resolution of the fast marching method used to identify the vias. By way of example, dimensions of cells in the grid used to detect vias can be larger than the cells in the grid to detect keyholes in the vias.

Figure 20:
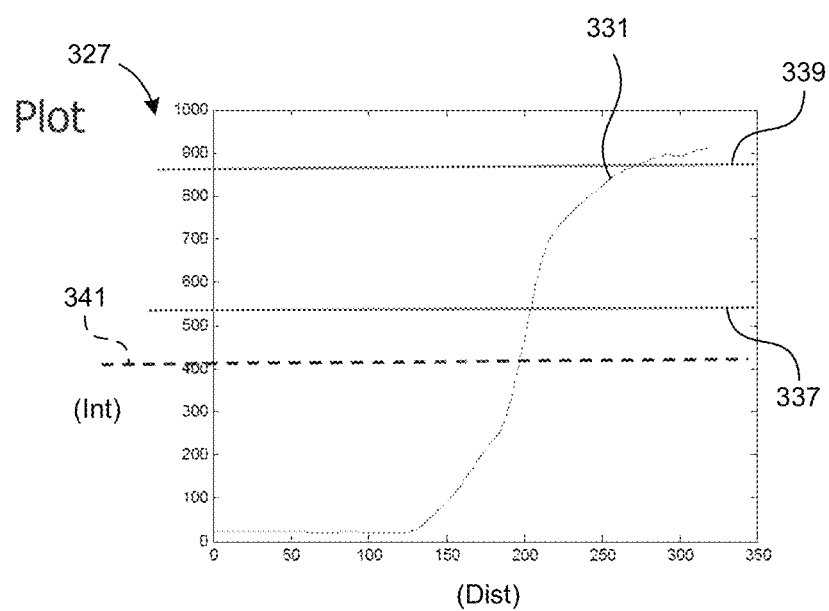
FIG. 20 is a plot of distance versus intensity for the image of FIG. 18 in accordance with an embodiment of the present technology.

FIG. 20 is a plot of distance versus intensity for the image 317 of FIG. 18. The intensity of the cell 321 of FIG. 18 is between 0 and 25 at distance 0 measured along the arrow of FIG. 18. The intensity begins to increase at a distance of about 125 corresponding to a cell 323 of FIG. 18. The rate of change in intensity generally increases from a distance of about 125 to about 190. The rate of change in intensity decreases from a distance equal to or greater than about 210. A smooth and continuous arrival time curve 331 corresponds to function that is differentiable at each point along the curve 331. In some embodiments, numerical techniques are used to generate the curve from the arrival time image data. The numerical techniques can include, without limitation, curve fitting techniques (e.g., linear regression, higher order polynomial fitting, exponential fitting, nonlinear fittings, etc.), interpolation, etc.

Figure 21:
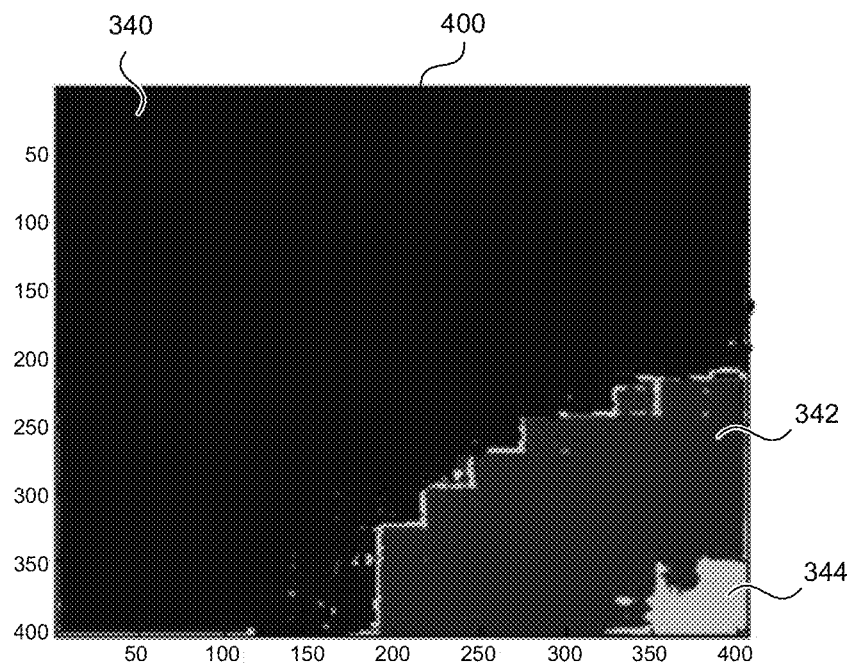
FIGS. 21 and 22 illustrate segmented images in accordance with embodiments of the present technology.
Figure 22:
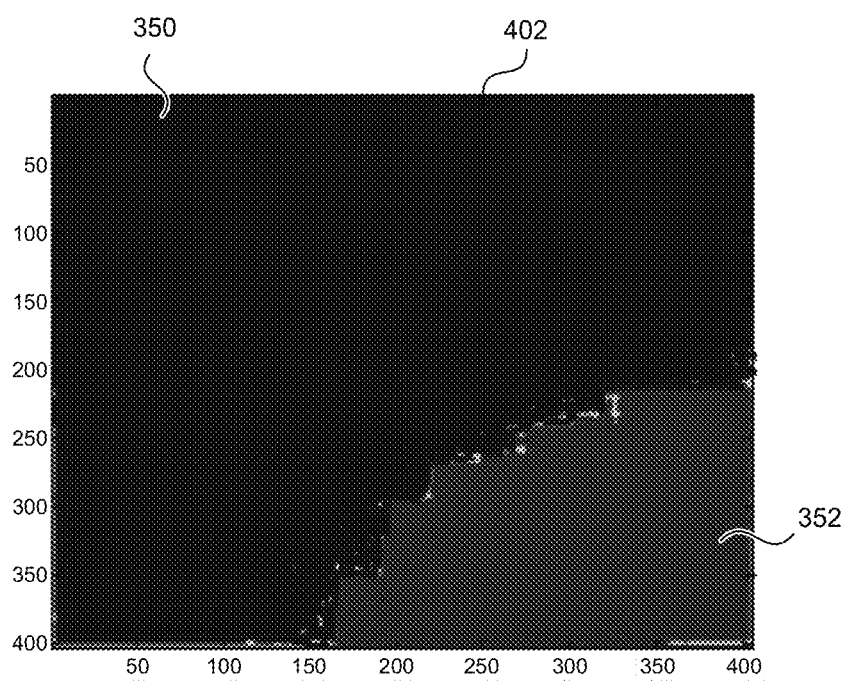

FIGS. 21 and 22 illustrate examples of segmented images generated using a descriptor. Generally, a descriptor can have a segmentation algorithm that utilizes threshold. A descriptor with two thresholds can be used to generate the segmented image 400 of FIG. 21. A descriptor with one threshold can be used to generate the segmented image 402 of FIG. 22.

Referring to FIGS. 20 and 21, a descriptor in the form of a targeted feature descriptor 327 can have segment thresholds 337, 339 at intensities of about 540, 870, respectively. The segment thresholds 337, 339 of FIG. 20 that define a first region 340, a second region 342, and a third region 344 in the image 400 of FIG. 21. The first region 340 corresponds to the portion of the image 317 of FIG. 18 with intensities less than 540. The second region 342 in FIG. 21 corresponds to the portion of the image 317 of FIG. 18 with intensities between 540 and 870. The third region 344 in FIG. 21 corresponds to the portion of the image 317 of FIG. 18 with intensities greater than about 870. The second region 342 can be identified as a potential keyhole.

The descriptor in the form of a targeted feature descriptor 341 can have a segmented threshold of about 410. FIG. 22 illustrates an image with a first region 350 and a second region 352 defined by the descriptor 341. The first region 350 corresponds to the portion of the image 317 of FIG. 18 with intensities equal to or less than 410. The second region 352 corresponds to the portion in the image 317 of FIG. 18 with intensities greater than 410.

Descriptors can have a number of thresholds that are selected based on, for example, the number of targeted features to be identified. For example, a first threshold can be used to detect boundaries of a contact or a via. A second threshold can be used to detect potential defects within the contact or via. Different descriptors can identify different targeted features. A stiction descriptor can detect potential stiction, an alignment descriptor can detect alignment of features, and a pattern descriptor can detect patterns. A single image can be analyzed using different descriptors. Additionally, different descriptors can be used to process different types of images. For example, a first descriptor can be used to analyze an SEM image from a manufacturer and a second descriptor can be used to analyze an SEM image from another manufacturer. The descriptors can compensate for differences in intensities between different imaging equipment. A descriptor can also be modified based on prior inspections (e.g., inspection of microelectronic devices, inspection of a wafer, inspection of a batch of wafers, etc.). This can increase the accuracy of the analysis and also may reduce inspection times.

FIG. 23 shows another example of an arrival time image 420 of the via 172a and keyhole 174a. A descriptor can be used to determine whether the cells or pixels correspond to a potential defect based on selection criteria. The selection criteria can be, for example, based on a threshold acceleration. The number of cells or pixels within the boundary of the via 172a (or other region of interest) that are at or above the threshold acceleration can be identified as discussed in connection with FIGS. 24 and 25.

FIG. 24 shows a segmented image of the keyhole 174a. The dark regions correspond to areas of the via 172a with an acceleration less than the threshold acceleration (e.g., an acceleration determined based on the arrival time image) of selection criteria and light pixels for all pixels or cells with an acceleration equal to or greater than the threshold acceleration of the selection criteria. The descriptor guided analysis can have a selection routine based on the number and position of the cells or pixels. In some embodiments, if the number of cells or pixels within a predetermined distance or area exceeds a threshold number, the cells or pixels can be identified as a keyhole. For example, if there are four neighboring cells or pixels with accelerations at or above the threshold acceleration, the four neighboring cells or pixels are identified as a keyhole. The corresponding keyhole in a raw image, a preprocessed image, or a processed image can be labeled. The region(s) of interest, threshold acceleration, selection criteria (e.g., number of neighboring cells or pixels, total number cells or pixels within an area, etc.) can be selected based on the targeted features. For example, the descriptor can be modified such that five connected selected pixels will identify a potential defect. The descriptor can utilize, without limitation, segmented thresholds, selection criteria (or criterion) for identifying potential defects (e.g., number of pixels in an area, number of connected pixels, total number of identified pixels, etc.), or the like.

In contrast to FIG. 24, FIG. 25 shows an image 435 corresponding to a properly formed via 436 of FIG. 19. The central region of the image 435 has a uniform intensity without any identified pixels or cells because the pixels or cells with the via 436 of FIG. 19 have an acceleration less than the threshold acceleration of the selection criteria. An automated identification routine recognizes that the via 436 does not include a potential defect.

Other types of speed functions and descriptors can be used. In some embodiments, the speed function R at (x, y) can be determined according to the equation:

$$R = \frac{1}{1 + \alpha[\nabla I(x, y)]} \quad \text{(Equation II)}$$

where $\nabla I(x, y)$ is the gradient image intensity at (x, y) and $\alpha$ is a constant which can be selected based on the detection. For example, $\alpha$ can be set to 1 and increased by 1 until a desired detection is achieved. In some embodiments, the maximum integer for $\alpha$ can be 15 or other appropriate maximum integer. The rate function R according to equation II can make the intensity less significant in the fast marching method as compared to the rate function R that is equal to the intensity. The changes of intensity rather than the intensity itself drive the rate function R of Equation II to provide enhanced boundary detection of relatively noisy images or patterns. The rate can be the lowest when the gradient of intensity is the highest to facilitate detection of features. For example, the gradient of intensity can be the highest at boundaries to significantly extend the calculated fast marching arrival time period within the boundary regions, to facilitate the detection of any noisy boundary contours. Other types of speed functions can also be used. Elliptical functions or other types of descriptors can be used to find characteristics (e.g., dimensions, shapes, etc.) of detected items. In some embodiments, a descriptor in the form of an ellipse function can be used to fit the boundary locations detected using the speed function R of Equation II. Thus, boundary locations can be detected without counting higher intensity pixels. Additionally or alternatively, lines, curves (e.g., $1^{st}$ order curves, $2^{nd}$ order curves, etc.), polygons (e.g., rectangles, squares, triangles, etc.), or other fitting features can be fitted (e.g., fitted to boundary values, pixels, cells, etc.) to enhance detection.

Figure 26:
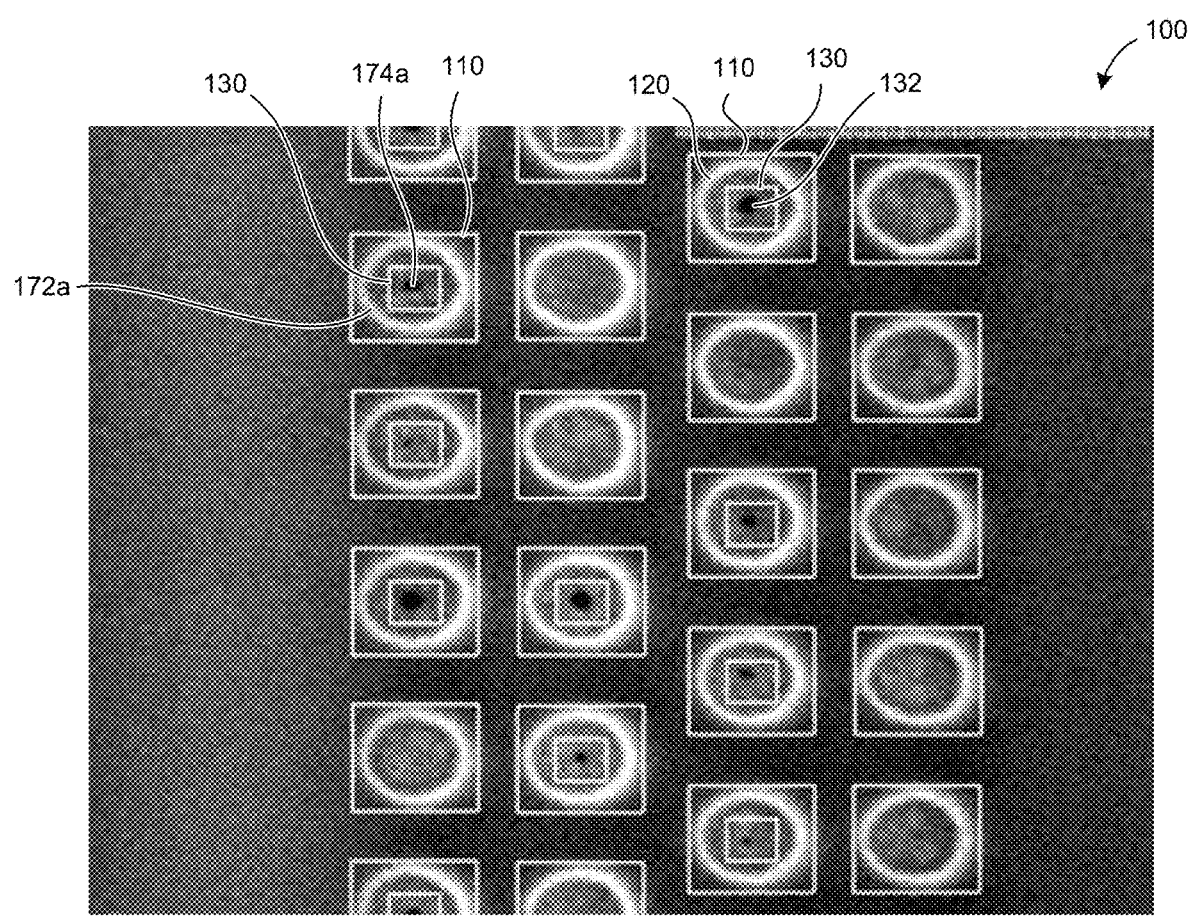
FIG. 26 illustrates an image of a microelectronic device with vias and potential defects identified in accordance with an embodiment of the present technology.

FIG. 26 shows boxes 110 identifying vias and boxes 130 identifying potential defects. The boxes 130 can be automatically overlaid in the image by identifying the potential defects using any of the methodologies described above. Some of the vias and defects are not labeled to avoid obscuring features in the image. The image 100 can be conveniently visually inspected to evaluate the potential defects. Vias with keyholes can be identified for discarding. If the image is improperly labeled, a user can modify the descriptor-based analysis to increase its accuracy. In other embodiments, potential defects can be identified by circles, ellipses, polygons, or the like.

Figure 27:
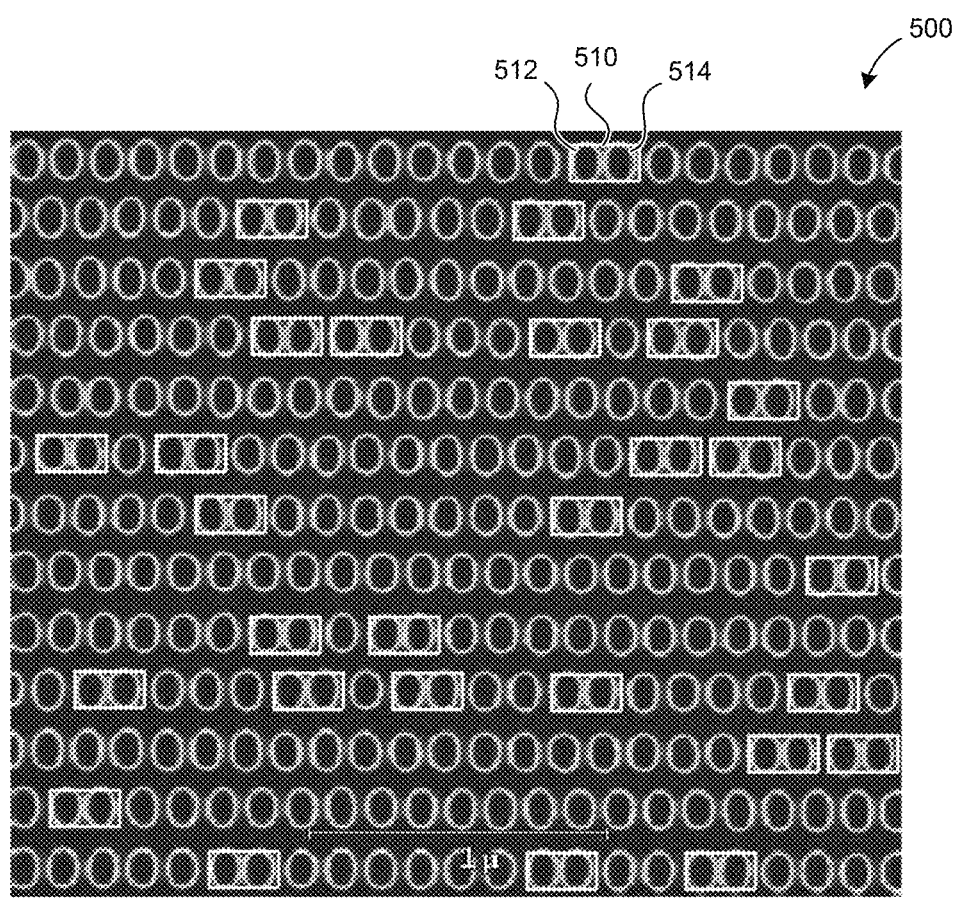
FIG. 27 illustrates an image with potential stictions identified in accordance with an embodiment of the present technology.

FIG. 27 illustrates an image 500 that includes thirteen rows of vias. The fast marching method can be used to identify vias and to evaluate the distance, if any, between adjacent vias (e.g., adjacent vias in the same row) to determine whether the vias are properly positioned. The boxes identify potential stiction. For example, a box 510 identifies potential stiction between vias 512, 514. A stiction descriptor can be selected to identify stiction based on spacing between adjacent vias (e.g., a preset distance), vias contacting one another, or the like. The distance between two vias can be determined and compared to a preset distance. If the measured distance is less than the preset distance, the two vias are identified as a potential stiction defect. The descriptor guided fast marching analysis can also be used to evaluate spacing between other features (e.g., spacing between pads, semiconductor layers, etc.).

Figure 28:
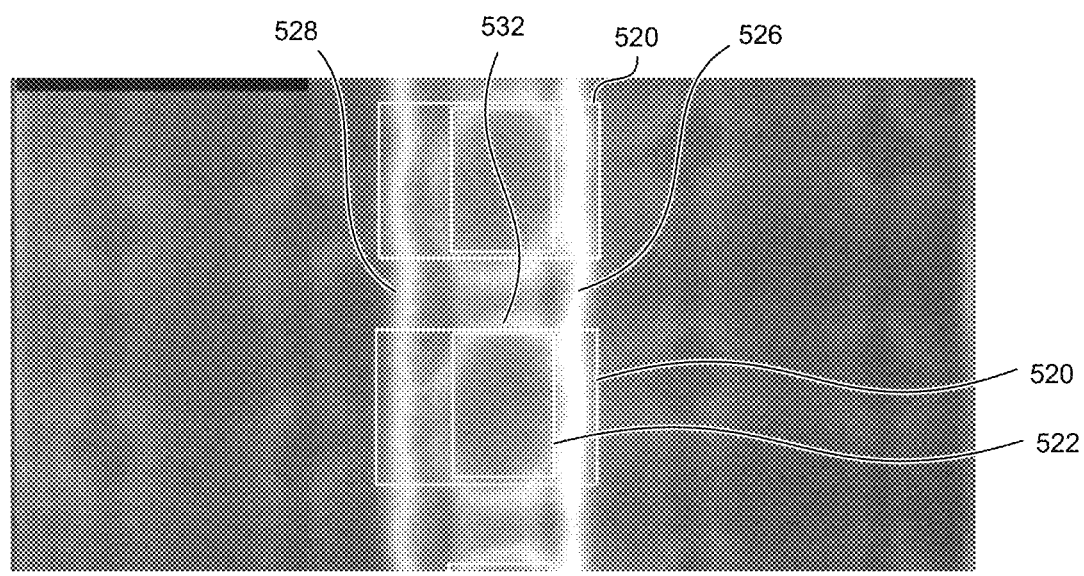
FIG. 28 illustrates an image with contacts within lines in accordance with an embodiment of the present technology.

FIG. 28 illustrates an image that includes contacts and boxes used to evaluate alignment of the contacts. An alignment descriptor can identify runners and contacts. A box 520 can indicate the position of runners 526, 528. A box 522 can indicate the position of a contact 532. The position of the box 522 relative to the box 520 can be evaluated to determine whether the contact 532 is properly positioned relative to the runners 526, 528.

Figure 29:
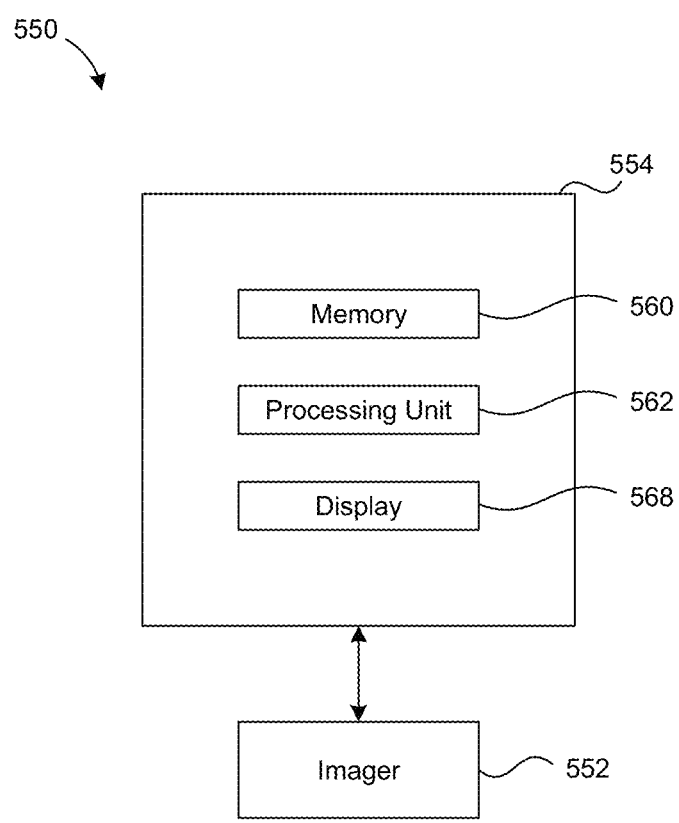
FIG. 29 illustrates an image processing system in accordance with an embodiment of the present technology.

FIG. 29 shows an image processing system in accordance with an embodiment of the present technology. An image processing system 550 includes an imager 552 and a computing system 554. The computing system 554 can analyze images captured by the imager 552 and display an output for viewing. The imager 552 can capture images of microelectronic devices, such as wafers (e.g., unprocessed wafers, processed wafers, etc.), semiconductor devices (e.g., LEDs, MEMS, integrated circuitry, memory circuit, digital signal processors, etc.), or portions thereof. Wafers can be single layer wafers or multilayer wafers. In some embodiments, the imager 552 captures images of electronic devices (e.g., LED displays, LCD displays, flat panel displays, etc.) and can include, without limitation, one or more image capture devices. Image capture devices can include, without limitation, scanning electron microscopes, transmission electron microscopes, optical microscopes, cameras, imaging sensors, or the like. The imager 552 can be integrated into fabrication equipment or can be standalone inspection equipment. Imagers from different manufacturers may produce images with different characteristics (e.g., intensity, resolution, etc.). The fast marching method can be used to accurately detect features in images from different equipment manufacturers.

The computing system 554 includes memory 560, processing unit 562, and a display 568. Memory 560 can include, without limitation, a computer readable medium, volatile memory, non-volatile memory, read-only memory (ROM), random access memory (RAM), or the like. The memory 560 can store information, including instructions (e.g., executable code, computer programs, etc.), reference images, correction algorithms, fast marching algorithms, descriptor functions, optimization programs (e.g., fast marching optimization algorithms, descriptor function optimization algorithms, etc.), calibration programs, labeling protocols, databases, look up tables, or the like. For example, the memory 560 can store a sequence of instructions executable by the processing unit 562.

The processing unit 562 can be in communication with the memory 560 and display 568 and can include, without limitation, one or more programmable processors, computers, central processing units, processing devices, microprocessors, digital signal processors (DSPs), and/or application-specific integrated circuits (ASICs). The processing unit 562 can execute instructions to perform the descriptor guided based analysis, fast marching method, etc.

The display 568 can be a liquid crystal display, LED display, or organic light emitting diode (OLED) display. Other types of displays can also be used. A user can view results on the display 568. If the display 568 is a touchscreen, the user can manually select displayed features. In some embodiments, the computing system 554 is communicatively coupled to a network. A user can view images transferred via the network to a remote display.

In operation, items to be inspected are delivered to the imager 552, which captures an image of the items. The processing unit 562 is configured to execute instructions from memory 560 to process the images. In one embodiment, the processing unit 562 executes instructions to automatically identify targeted features. Different instructions can be executed to analyze different targeted features. Additionally or alternatively, results can be stored in memory 560 or transmitted via a communication link (e.g., a computer communication link, the Internet, etc.) to a remote computer or network for viewing, storage, and/or analysis. Results can be used to monitor performance of processing equipment (e.g., deposition equipment, sputtering equipment, CMP equipment, cluster tools, etc.).

The computing system 554 can perform self calibration. A raw image can be sent to the processing unit 562. Information (e.g., dimensions, shapes, position, etc.) about the target feature can be stored in memory or inputted by a user. The processing unit 562 can determine an appropriate scale to perform fast marching method. The computing system 554 can match the boundaries to expected boundary sizes (e.g., diameters of vias) and can perform self calibration for new images based on variations of scale. After the computer system 554 identifies vias, the computer system 554 can rapidly identify additional vias.

Certain aspects of the technology described in the context of particular embodiments may be combined or eliminated in other embodiments. For example, embodiments disclosed herein can be used to inspect integrated circuitry, optoelectronics, packaging, or the like. Additionally, the fast marching method can be used to process raw images. Different types of fast marching methods (e.g., generalized fast marching methods, classical fast marching methods, etc.) can be combined with other analysis techniques (e.g., level set method). For example, a portion of an image can be processed using the fast marching method and another portion of the image can be processed using a level set method. Results from the fast marching method and results from the level set method can be compared or combined. Descriptors (e.g., descriptor algorithms, descriptor functions, etc.) can be used to modify the fast marching methods, identify regions of an image for detailed analysis, and the like. Further, while advantages associated with certain embodiments have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly described or shown herein.

What is claimed is:

1. A method for identifying defects of a microelectronic device, the method comprising:
   processing a first image of the microelectronic device using a fast marching method to produce a second, processed image representative of the first image of the microelectronic device;
   determining one or more potential defects in the second image using at least one defect descriptor for segmenting the second image;
   identifying device features in the first image of the microelectronic device;
   identifying potential defects, if any, in the first image of the microelectronic device based on the determination of the one or more potential defects in the second image, the potential defects having associated device features; and
   applying first labels to respective identified device features in the first image and second labels to respective identified potential defects in the first image, the respective identified device features and the respective identified potential defects being spaced apart from their first and second labels, wherein each of the second labels is within an associated one of the first labels.

2. The method of claim 1, further comprising displaying, via a screen, the first image of the microelectronic device with the identified device features and potential defects via labelling.

3. The method of claim 1, further comprising using different first and second labels to identify the device features and the potential defects.

4. The method of claim 1, wherein determining the one or more potential defects includes producing a segmented image based on the second image, wherein the first image of the microelectronic device is non-segmented.

5. The method of claim 1, wherein the method is performed without having defect information about the first image of the microelectronic device.

6. The method of claim 1, wherein the fast marching method and the at least one defect descriptor are configured to identify the one or more potential defects without having information about the first image.

7. The method of claim 1, wherein determining the one or more potential defects in the second image includes segmenting the second image based on at least one threshold value of intensity, and wherein potential defects are identified based on the segmentation.

8. The method of claim 1, wherein the at least one defect descriptor includes a keyhole defect descriptor for identifying a keyhole in an associated via, and wherein the identifying the device features includes identifying at least one via.

9. The method of claim 1, wherein processing the first image of the microelectronic device includes calculating arrival time information as follows:

$$R|\nabla T|=1$$

where R is a speed function based on intensity of the image and T is the arrival time information.

10. The method of claim 9, wherein R is an intensity of a pixel or cell in the first image.

11. The method of claim 9, wherein R is calculated as follows:

$$R = \frac{1}{1+\alpha \nabla I}$$

where ∇I is a gradient of image intensity and a is an integer.

12. A method for identifying defects of a microelectronic device, the method comprising:
  processing an image of the microelectronic device using a fast marching method to produce an arrival time image;
  determining one or more potential defects in the arrival time image using at least one defect descriptor configured to segment the arrival time image independent of locations of defects in the arrival time image;
  identifying one or more device features and potential defects of the one or more device features, if any, in the image of the microelectronic device, wherein the identification of the potential defects is based on the determination of the one or more potential defects in the arrival time image; and
  labelling the identified one or more device features and the identified potential defects in in the image of the microelectronic device, wherein the labelled image of the microelectronic device includes labels indicating the identified potential defects for visual inspection of the identified potential defects, wherein the one or more device features and the potential defects are unobstructed by their corresponding labels, wherein each of the labels that indicate the identified potential defects are within one of the labels that indicate the corresponding one or more device features.

13. The method of claim 12, further comprising displaying the labelled image of the microelectronic device.

14. The method of claim 12, wherein labelling the identified one or more device features and the identified potential defects includes
  labelling the one or more device features in the image of the microelectronic device with feature identifiers; and
  labelling the potential defects, if any, in the image of the microelectronic device with potential defect identifiers that are different from the feature identifiers, wherein the labelled potential defects, if any, correspond to the identified potential defects in the arrival time image.

15. A method for identifying defects of a microelectronic device, the method comprising:
  processing a first image of the microelectronic device using a fast marching method to produce a second, processed image representative of the first image of the microelectronic device;
  segmenting the second image using at least one defect descriptor;
  identifying one or more potential defects in the segmented second image;
  identifying device features in the first image of the microelectronic device, each of the one or more potential defects having an associated identified device feature; and
  generating a defect-labelled first image of the microelectronic device by applying first labels that enclose and are spaced apart from the identified one or more potential defects in the first image of the microelectronic device to avoid obscuring the identified one or more potential defects and applying second labels that enclose the associated identified device features and the first labels of an associated one or more potential defect.

16. The method of claim 15, wherein applying the first and second labels includes overlaying the first and second labels in the first image of the microelectronic device, wherein the first image of the microelectronic device is a raw image.

* * * * *